(12) United States Patent
Zhou et al.

(10) Patent No.: US 11,232,066 B2
(45) Date of Patent: Jan. 25, 2022

(54) METHOD FOR DATA MIGRATION AND TERMINAL

(71) Applicant: Guangdong Oppo Mobile Telecommunications Corp., Ltd., Guangdong (CN)

(72) Inventors: Xuan Zhou, Guangdong (CN); Tianyang Lu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 510 days.

(21) Appl. No.: 16/229,430

(22) Filed: Dec. 21, 2018

(65) Prior Publication Data

US 2019/0121786 A1 Apr. 25, 2019

Related U.S. Application Data

(63) Continuation of application No. PCT/CN2017/092093, filed on Jul. 6, 2017.

(30) Foreign Application Priority Data

Sep. 14, 2016 (CN) .......................... 201610828058.4

(51) Int. Cl.
*G06F 16/00* (2019.01)
*G06F 16/11* (2019.01)
*G06F 16/16* (2019.01)

(52) U.S. Cl.
CPC .......... *G06F 16/119* (2019.01); *G06F 16/162* (2019.01)

(58) Field of Classification Search
CPC ....... G06F 16/16; G06F 16/119; G06F 16/162
(Continued)

(56) References Cited

U.S. PATENT DOCUMENTS 6,108,748 A * 8/2000 Ofek ...................... G06F 3/0607
711/100
7,219,092 B2 * 5/2007 Ikegaya ................ G06F 3/0616
(Continued)

FOREIGN PATENT DOCUMENTS

CN 101098343 A 1/2008
CN 102110031 A 6/2011
(Continued)

OTHER PUBLICATIONS

Extended European search report issued in corresponding European application No. 17850082.3 dated May 3, 2019.
(Continued)

*Primary Examiner* — Vincent F Boccio
(74) *Attorney, Agent, or Firm* — Young Basile Hanlon & MacFarlane, P.C.

(57) ABSTRACT

A method for data migration is provided. The method includes the following. A communication connection with a source migration terminal is established. A file list on the source migration terminal is acquired after the source migration terminal is accessed. First operations and second operations are executed in parallel. The first operations include reading out files on the source migration terminal according to the file list and storing the files read out on a migration terminal. The second operations include displaying the file list, receiving selection of a non-migrated file in the file list, and deleting the non-migrated file after the non-migrated file is migrated from the source migration terminal to the migration terminal and stored in the migration terminal. A terminal is further provided.

20 Claims, 3 Drawing Sheets

(58) Field of Classification Search
USPC .......................................................... 707/821
See application file for complete search history.

(56) References Cited

U.S. PATENT DOCUMENTS

| | | | |
|---|---|---|---|
| 9,128,882 B2 | 9/2015 | Williams | |
| 10,146,467 B1* | 12/2018 | Chandramohan | G06F 3/0647 |
| 2001/0002204 A1* | 5/2001 | Jebens | H04N 1/00151 |
| | | | 375/240.01 |
| 2004/0236797 A1* | 11/2004 | Ikegaya | G06F 3/0689 |
| 2006/0184540 A1* | 8/2006 | Kung | G06F 16/958 |
| 2007/0055715 A1* | 3/2007 | Achiwa | G06F 16/119 |
| 2010/0235829 A1* | 9/2010 | Shukla | H04L 67/34 |
| | | | 717/177 |
| 2011/0040943 A1* | 2/2011 | Kondo | G06F 3/0619 |
| | | | 711/162 |

FOREIGN PATENT DOCUMENTS

| | | |
|---|---|---|
| CN | 103338306 A | 10/2013 |
| CN | 103399889 A | 11/2013 |
| CN | 104202478 A | 12/2014 |
| CN | 105224676 A | 1/2016 |
| CN | 105373447 A | 3/2016 |
| CN | 105491113 A | 4/2016 |
| JP | 2010134860 A | 6/2010 |

OTHER PUBLICATIONS

Hrithik Kaul: "Xiaomi launches Mi Mover App to migrate data from old Smartphone easily—TechaGuy", techaguy. blogspot.com, Jul. 26, 2016 (Jul. 26, 2016), pp. 1-3, Retrieved from the Internet: URL: https://web.archive.org/web/20160726203309/https://techaguy.blogspot.com/2016/03/xiaomi-launches-mi-mover-app-to-migrate.html [retrieved on Apr. 24, 2019] the whole document.
Examination report issued in corresponding European application No. 17850082.3 dated Dec. 9, 2020.
Pratap, Ketan "Xiaomi's Mi Mover App to Help Transfer Data From an Old Device", URL: https://gadgets.ndtv.com/apps/news/xiaomis- mi-mover-app-to-help-transfer-data-from-an-old-device-809757.
First Examination Report and English Translation issued in corresponding IN application No. 201917000355 dated Dec. 30, 2020.
Examination report issued in corresponding European application No. 17850082.3 dated Jun. 10, 2020.
English translation of the first OA issued in corresponding CN application No. 201610828058.4 dated Mar. 5, 2019.
International search report issued in corresponding international application No. PCT/CN2017/092093 dated Sep. 30, 2017.

* cited by examiner

METHOD FOR DATA MIGRATION AND TERMINAL

CROSS-REFERENCE TO RELATED APPLICATION(S)

This application is a continuation of PCT/CN2017/092093, filed on Jul. 6, 2017, which claims priority to Chinese Patent Application No. 201610828058.4, filed on Sep. 14, 2016, the disclosures of which are hereby incorporated by reference in their entirety.

TECHNICAL FIELD

The present disclosure relates to a terminal technology field, and more particular to a method for data migration and a terminal.

BACKGROUND

With the development of terminal technology, the update speed of smart phones, tablets, and other smart terminals is getting faster and faster. When replacing an old mobile phone with a new mobile phone, a user does not want to lose data in the old mobile phone due to the replacement of the old mobile phone, but wants to copy desired data in the old mobile phone to the new mobile phone. Therefore, many service providers or applications now provide a phone transfer function, that is, all data in the old mobile phone, including software, settings, and other data, can be copied to the new mobile phone completely as they were, which facilitates data transfer during mobile phone replacement.

SUMMARY

In a first aspect of the present disclosure, a method for data migration is provided. The method includes the following. A communication connection with a source migration terminal is established. A file list on the source migration terminal is acquired after the source migration terminal is accessed. First operations and second operations are executed in parallel. The first operations include reading out files on the source migration terminal according to the file list and storing the files read out on a migration terminal. The second operations include displaying the file list, receiving selection of a non-migrated file in the file list, and deleting the non-migrated file after the non-migrated file is migrated from the source migration terminal to the migration terminal and stored in the migration terminal.

In a second aspect of the present disclosure, a terminal is provided. The terminal includes at least one processor and a computer readable storage. The computer readable storage is coupled to the at least one processor and stores at least one computer executable instruction thereon which, when executed by the at least one processor, causes the at least one processor to carry out actions, including: establishing a communication connection with a source migration terminal; acquiring a file list on the source migration terminal after accessing the source migration terminal; executing first operations and second operations in parallel; the first operations including reading out files on the source migration terminal according to the file list and storing the files read out on a migration terminal; the second operations including displaying the file list, receiving selection of a non-migrated file in the file list, and deleting the non-migrated file after the non-migrated file is migrated from the source migration terminal to the migration terminal and stored in the migration terminal.

In a third aspect of the present disclosure, there is provided a non-transitory computer-readable storage medium storing a computer program which, when executed by a processor, cause the processor to carry out following actions: establishing a communication connection with a source migration terminal; acquiring a file list on the source migration terminal after accessing the source migration terminal; executing first operations and second operations in parallel; the first operations including reading out files on the source migration terminal according to the file list and storing the files read out on a migration terminal; the second operations including displaying the file list, receiving selection of a non-migrated file in the file list, and deleting the non-migrated file after the non-migrated file is migrated from the source migration terminal to the migration terminal and stored in the migration terminal.

BRIEF DESCRIPTION OF DRAWINGS

To illustrate the technical solutions in the implementations of the present disclosure more clearly, the following briefly illustrates the accompanying drawings required for describing the implementations or the related art. The accompanying drawings in the following description merely illustrate some implementations of the present disclosure. Those of ordinary skill in the art may also obtain other drawings based on these accompanying drawings without creative efforts.

DETAILED DESCRIPTION

Figure 1:
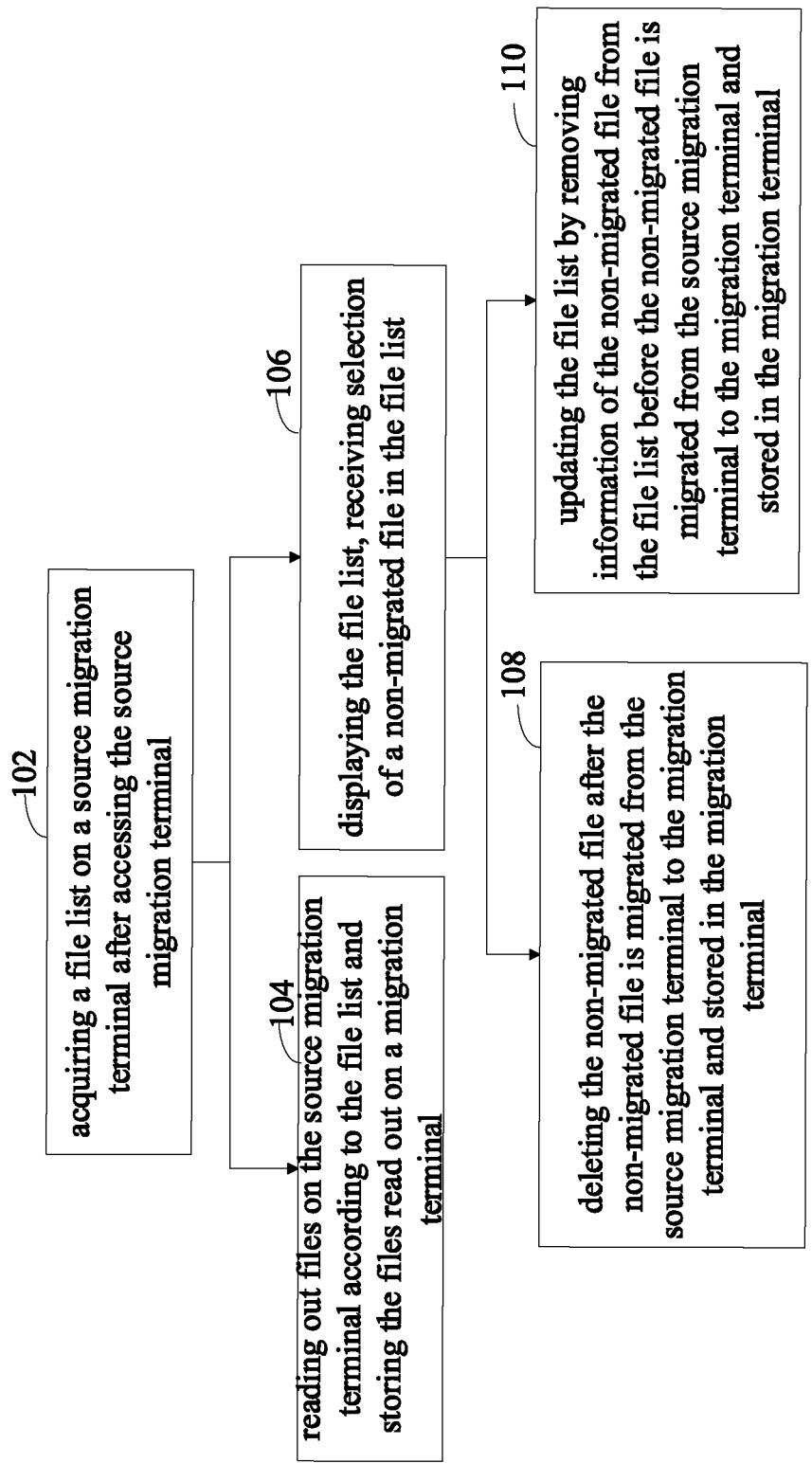
FIG. 1 is a schematic flow diagram illustrating a method for data migration according to an implementation of the present disclosure.

Technical solutions in implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

A large amount of data is usually stored on an old phone, and it takes a long time to migrate data in the process of phone transfer (that is, data backup and recovery). During phone transfer, a user needs to first select data to be migrated, such as data of all or part of applications, and then data migration can be started. Moreover, during data migration, both the old phone and a new phone will display an interface of phone transfer, and the user cannot exit the interface, otherwise the data migration will be interrupted. When the amount of data to be migrated is large, the user will not be able to use the old phone or the new phone for a long time, which causes inconvenience to the user.

A method for data migration is provided according to implementations of the present disclosure. An implementation of the method may rely on computer programs. The computer programs can be an application for data migration based on an Android® system, such as Phone Transfer® or a data backup-migration-recovery application. A computer system may be a smart phone, a tablet, or other terminals on which the computer programs run.

According to the method for data migration and a terminal provided in implementations of the present disclosure, a migration terminal can acquire a file list on a source migration terminal and execute data migration according to the file list after a connection between the migration terminal and the source migration terminal is established. The migration terminal can display the file list after acquiring the file list from the source migration terminal. A file in the file list can be marked as a non-migrated file by the user. As for the file marked as the non-migrated file, if it has been migrated to the migration terminal and stored in the migration terminal, it will be deleted. That is, the user does not have to wait to determine whether each file needs to be migrated before data migration, and data migration can be performed immediately after the connection between the migration terminal and the source migration terminal is established. Data that is not desired to be migrated can be deleted in the migration terminal after data migration is completed. According to the present disclosure, data migration can be performed immediately after the connection between the migration terminal and the source migration terminal is established, which reduces time consumption of preparation work before data migration. Further, data migration and determination of whether or not to migrate each file can be performed concurrently, thereby reducing time consumption and improving the speed of data migration, and improving user experience.

As illustrated in FIG. 1, a method for data migration includes the following.

At block 102, a file list on a source migration terminal is acquired after a source migration terminal is accessed.

In this implementation, a migration terminal is configured to execute the method. That is, in the implementation, data is migrated from the source migration terminal to the migration terminal and stored in the migration terminal. For example, during phone transfer, data on an old phone will be copied to a new phone as it is. The old phone is the source migration terminal and the new phone is the migration terminal.

Before data migration, a communication connection between the migration terminal and the source migration terminal needs to be established first. For example, the communication connection between the migration terminal and the source migration terminal may be a Bluetooth® connection, a wireless fidelity (Wi-Fi) connection, a near field communication (NFC) connection, or a wired connection. That is, data on the source migration terminal can be migrated to the migration terminal via the communication connection.

In an implementation, after the new phone (that is, the migration terminal) and the old phone (that is, the source migration terminal) respectively launch a data migration application installed, such as Phone Transfer®, the communication connection between the new phone and the old phone can be established.

In an implementation, after the communication connection between the migration terminal and the source migration terminal is established, an interface will be displayed on the new phone through which the user can preview data on the old phone. After accessing the source migration terminal, the migration terminal acquires the file list on the source migration terminal via the communication connection with the source migration terminal. The file list contains information of all files to be migrated.

Further, first operations (that is, operations at block 104) and second operations (that is, in an implementation, the second operations include operations at block 106 and block 108, in another implementation, the second operations include operations at block 106 and block 110) are executed in parallel after the file list on the source migration terminal is acquired.

At block 104, files on the source migration terminal are read out according to the file list and the files read out are stored on the migration terminal.

In an implementation, after the communication connection between the migration terminal and the source migration terminal is established, or after the migration terminal accesses the source migration terminal, proceed to the operations at block 104.

In an implementation, after the file list on the source migration terminal is acquired according to operations at block 102, data migration can be performed according to the file list. Each file contained in the file list can be read out from the source migration terminal and the files read are stored on the migration terminal. In an implementation, during the process that the files are migrated from the source migration terminal to the migration terminal, the file list on the source migration terminal and a corresponding data preview interface can be displayed on a display interface of the migration terminal, so that the user can execute corresponding operations on the file list and files of the source migration terminal which are displayed on the migration terminal. In other words, the terminal can execute the first operations and the second operations in parallel.

At block 106, the file list is displayed and selection of a non-migrated file in the file list is received.

In this implementation, the user can determine, in the file list displayed on the migration terminal, whether a file displayed is to be migrated, that is, the user can select a file which does not need to be migrated in the file list, in other words, the file selected by the user in the file list is marked as a non-migrated file. In an implementation, the user selects several files in the file list displayed and marks each of files selected as a non-migrated file.

In an implementation, the process that a file is marked as a non-migrated file is performed concurrently with the process that the file is migrated from the source migration terminal to the migration terminal and stored in the migration terminal. That is, when marked as a non-migrated file, the file may have been migrated to the migration terminal, or the file may not have been migrated to the migration terminal. The following will be discussed separately according to these two situations mentioned above.

At block 108, the non-migrated file is deleted in the case that the non-migrated file has been migrated from the source migration terminal to the migration terminal and stored in the migration terminal.

Operations at block 108 corresponding to the situation where the file marked as a non-migrated file and the file has been migrated from the source migration terminal to the migration terminal and stored in the migration terminal. However, according to the intention of the user, the non-migrated file does not need to be migrated from the source migration terminal to the migration terminal and stored in the migration terminal. Therefore, when the non-migrated file has been stored on the migration terminal, the non-migrated file needs to be deleted. In this implementation, the non-migrated file will be deleted after all data on the source migration terminal has been migrated to the migration terminal. That is, after all data on the source migration terminal has been migrated to and stored on the migration terminal, non-migrated files selected by the user in the file list will be deleted one by one.

In an implementation, the non-migrated file is deleted as follows. After migrated from the source migration terminal to the migration terminal to be stored in the migration terminal, the non-migrated file will be marked with a deleting mark. The non-migrated file with the deleting mark will be deleted after all files in the file list have been migrated from the source migration terminal to the migration terminal and stored.

That is, when determining a file as a non-migrated file, whether each file to be migrated has been migrated from the source migration terminal to the migration terminal to be stored is determined, mark a non-migrated file with the deleting mark after the non-migrated file is migrated from the source migration terminal to the migration terminal and stored in the migration terminal, and delete the non-migrated file with the deleting mark one by one after all files in the file list have been migrated.

Contrary to the case that the non-migrated file has been migrated from the source migration terminal to the migration terminal and stored in the migration terminal, in another implementation, a file marked as a non-migrated file has not been migrated from the source migration terminal to the migration terminal and stored in the migration terminal. That is, the non-migrated file has not been stored on the migration terminal. In this case, the following is executed after receiving the selection of the non-migrated file in the file list.

At block 110, the file list is updated by removing information of the non-migrated file from the file list before the non-migrated file is migrated from the source migration terminal to the migration terminal and stored in the migration terminal.

That is, the non-migrated file does not need to be migrated any more when the non-migrated file has not been migrated to the migration terminal. Since file migration between the source migration terminal and the migration terminal is performed according to the file list, the information of the non-migrated file that has not been migrated to the migration terminal will be removed from the file list.

In an implementation, the deletion of the non-migrated file can also be revoked.

In an implementation, following operations are further executed after the information of the non-migrated file is removed from the file list. The information of the non-migrated file with a deleting mark in the file list is displayed in the file list. A revoking instruction for deletion is received when there is at least one file in the file list which has not been migrated from the source migration terminal to the migration terminal and stored in the migration terminal. The non-migrated file marked with the deleting mark corresponding to the revoking instruction for deletion is acquired and the deleting mark of the non-migrated file is removed.

That is, in terms of the non-migrated file removed from the file list, considering that the user may execute other operations subsequently, the non-migrated file can be displayed with the deleting mark in the file list or the non-migrated file can be displayed in a separate non-migrated-file list. Each non-migrated file will be marked with the deleting mark. Further, a revoking instruction for deleting a non-migrated file can be input into a corresponding file list or a corresponding non-migrated-file list.

When the revoking instruction for deletion inputted by the user is detected, the non-migrated file corresponding to the revoking instruction for deletion will be acquired and the deleting mark of the non-migrated file will be removed. That is, the non-migrated file will be restored into the file list for further migration.

In an implementation, following operations are further executed after the information of the non-migrated file is removed from the file list. The information of the non-migrated file in a separate non-migrated-file list is displayed. A revoking instruction for deletion is received when there is at least one file in the file list which has not been migrated from the source migration terminal to the migration terminal and stored in the migration terminal. The non-migrated file corresponding to the revoking instruction for deletion is acquired.

In an implementation, not all files on the source migration terminal should be stored on the migration terminal, such as an operating system file. The migration terminal and the source migration terminal may differ in system configuration or other settings, and an operating system file of the migration terminal may be incompatible with the source migration terminal. Therefore, in order to avoid such incompatibility and to avoid a duplication of files between the source migration terminal and the migration terminal, in an implementation, the operating system file does not need to be migrated. Based on the above, in an implementation, the file list is displayed as follows. The operating system file is concealed in the file list.

In an implementation, since data migration is performed according to the file list and the operating system file is concealed in the file list, the operating system file will be automatically skipped and will not be migrated during corresponding data migration.

Figure 2:
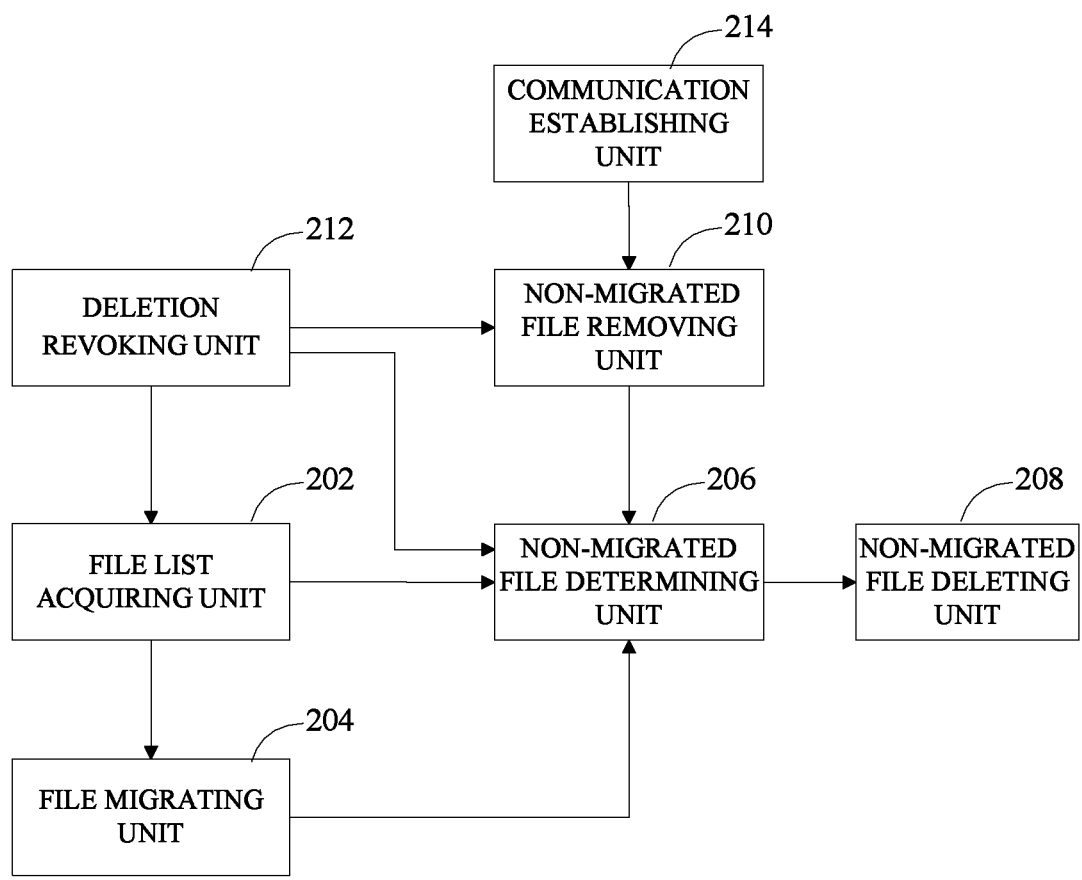
FIG. 2 is a schematic structural diagram illustrating an apparatus for data migration according to an implementation of the present disclosure.

An apparatus for data migration is further provided in the implementations of the present disclosure. As illustrated in FIG. 2, the apparatus includes a file list acquiring unit 202, a file migrating unit 204, a non-migrated file determining unit 206, and a non-migrated file deleting unit 208.

The file list acquiring unit 202 is configured to acquire a file list on a source migration terminal after the source migration terminal is accessed. The file list contains information of all files to be migrated.

The file migrating unit 204 is configured to read out files on the source migration terminal according to the file list and store the files read out on a migration terminal.

The non-migrated file determining unit 206 is configured to display the file list and receive a non-migrated file selected in the file list.

The non-migrated file deleting unit 208 is configured to delete the non-migrated file after the non-migrated file is migrated from the source migration terminal to the migration terminal and stored in the migration terminal.

In an implementation, as illustrated in FIG. 2, the apparatus further includes a non-migrated file removing unit 210. The non-migrated file removing unit 210 is configured to update the file list by removing information of the non-migrated file from the file list before the non-migrated file is migrated from the source migration terminal to the migration terminal and stored in the migration terminal.

In an implementation, the non-migrated file deleting unit 208 is further configured to mark the non-migrated file with a deleting mark after the non-migrated file is migrated from the source migration terminal to the migration terminal and stored in the migration terminal, and to delete the non-migrated file with the deleting mark when all files in the file list have been migrated from the source migration terminal to the migration terminal and stored in the migration terminal.

In an implementation, as illustrated in FIG. 2, the apparatus further includes a deletion revoking unit 212. The deletion revoking unit 212 is configured to display the non-migrated file, to receive a revoking instruction for deletion when there is at least one file in the file list which has not been migrated from the source migration terminal to the migration terminal and stored in the migration terminal, and to acquire a non-migrated file marked with a deleting mark corresponding to the revoking instruction for deletion and remove the deleting mark of the non-migrated file.

The deletion revoking unit 212 configured to display the non-migrated file is configured to display the non-migrated file with the deleting mark in the file list, or to display the non-migrated file in a separate non-migrated-file list.

In an implementation, the file list acquiring unit 202 is further configured to conceal an operating system file in the file list.

In an implementation, the apparatus further includes a communication establishing unit 214.

The communication establishing unit 214 is configured to establish a communication connection with the source migration terminal. The communication connection with the source migration terminal includes at least one of: a Bluetooth® connection, a Wi-Fi connection, an NFC connection, and a wired connection.

According to the method and the apparatus mentioned above, the migration terminal can acquire the file list on the source migration terminal and migrate data according to the file list after the connection between the migration terminal and the source migration terminal is established. The migration terminal can display the file list after acquiring the file list from the source migration terminal. The file in the file list can be marked as the non-migrated file by the user. As for the file marked as the non-migrated file, after the non-migrated file is migrated to the migration terminal and stored in the migration terminal, the non-migrated file on the migration terminal will be deleted. That is, data migration can be performed before each file in the file list is determined whether to be migrated or not, and data migration can be performed immediately after the connection between the migration terminal and the source migration terminal is established. Data that is not desired to be migrated can be deleted on the migration terminal after data migration is completed. According to the present disclosure, data migration can be performed immediately after the connection between the migration terminal and the source migration terminal is established, which reduces time consumption of preparation work before data migration. Further, data migration and determination of each file whether to be migrated or not can be performed concurrently, thereby reducing time consumption of the whole data migration, improving the speed of data migration of the terminal, and improving user experience.

Figure 3:
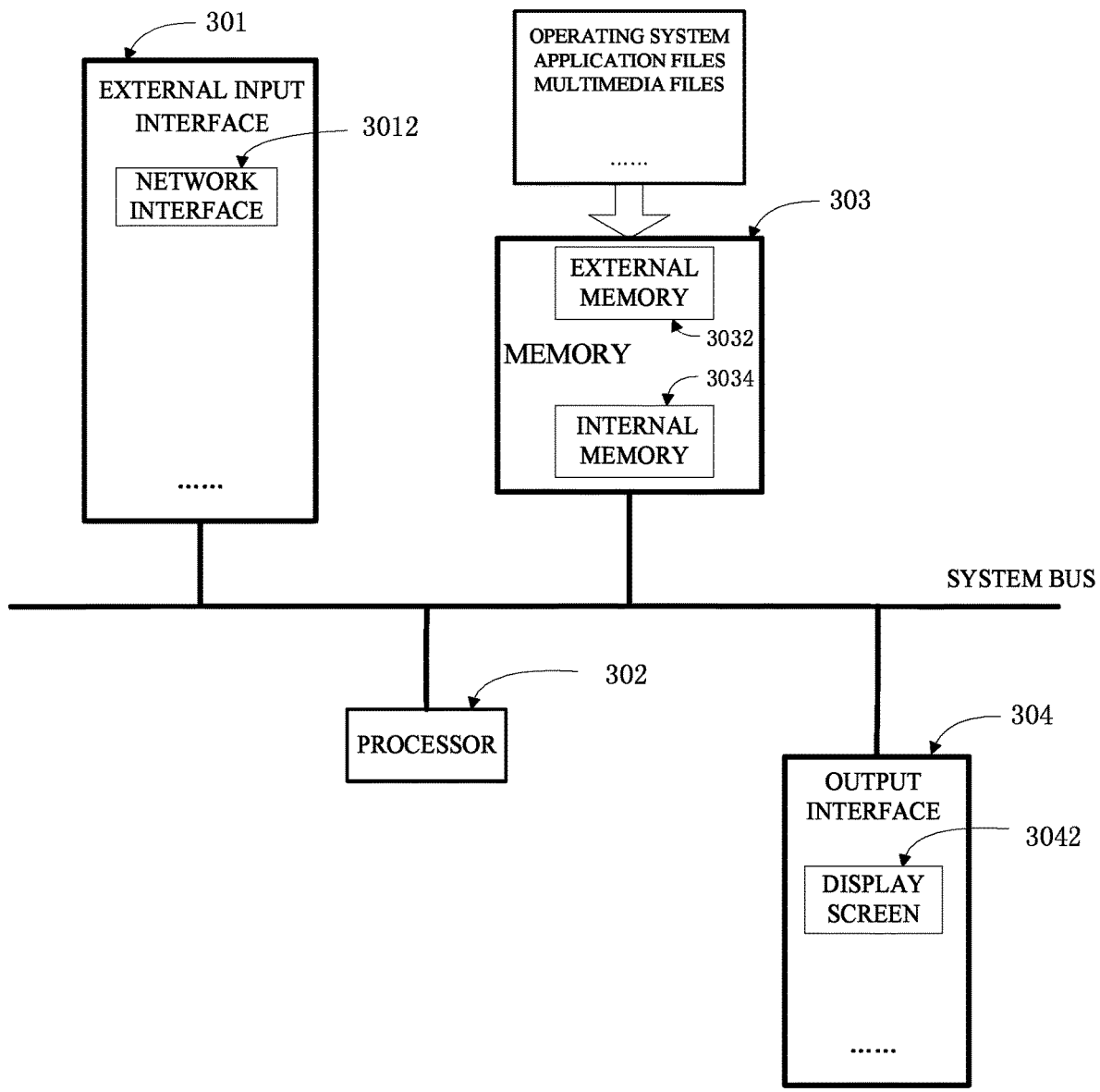
FIG. 3 is a schematic structural diagram illustrating a terminal running the foregoing method for data migration according to an implementation of the present disclosure.

A terminal is further provided in the implementations of the present disclosure. FIG. 3 illustrates a terminal of a computer system that runs the method for data migration. The computer system can be a terminal such as a smart phone, a tablet computer, or a palmtop computer. In one implementation, the terminal includes an external input interface 301, a processor 302, a memory 303, and an output interface 304 that are coupled via a system bus. In an implementation, the external input interface 301 includes at least a network interface 3012. The memory 303 may include an external memory 3032 (e.g., a hard disk, an optical disk, or a floppy disk, etc.) and an internal memory 3034. The output interface 304 may include at least a device such as a display screen 3042.

In this implementation, the operations of the method is based on computer programs, and program files of the computer programs are stored in the external memory 3032 of the foregoing computer system, loaded into the internal memory 3034 when running, and then transmitted to the processor 302 for execution after being compiled into machine codes. Thus, the file list acquiring unit 202, the file migrating unit 204, the non-migrated file determining unit 206, the non-migrated file deleting unit 208, the non-migrated file removing unit 210, and the deletion revoking unit 212 are logically formed on the von Neumann architecture-based computer system. During the execution of the method for data migration, input parameters are received via the external input interface 301, sent to the memory 303 for caching, and then input to the processor 302 for processing. Result data processed is cached in the memory 303 for subsequent processing or sent to the output interface 304 for output.

The operations in the method of the implementations of the present disclosure may be sequentially adjusted, combined, and deleted according to actual needs.

The units of the terminal in the implementations of the present disclosure may be combined, divided, and deleted according to actual needs. The terminal provided by the implementations of the present disclosure includes, but is not limited to, a terminal equipped with an iOS® system, an Android® system, a Microsoft® system, or other operating systems. The terminal is a mobile phone for example. Other terminals are also included, such as a laptop computer, a tablet computer, or a desktop computer having a touch-sensitive surface (e.g., a touch screen display and/or a touch pad).

In the following, take a terminal having a display and a touch-sensitive surface as an example. It should be understood that, the terminal may include one or more other physical user interface devices, such as a physical keyboard, a mouse, and/or a joystick, and the like.

The terminal typically supports a variety of applications, such as one or more of: a drawing application, rendering applications, word processing applications, web page creation applications, disk editing applications, spreadsheet applications, gaming applications, telephony applications, video conferencing applications, email applications, instant messaging applications, workout support applications, photo management applications, digital camera applications, digital video camera applications, web browsing applications, digital music player applications program, and digital video player applications.

Various applications executable on the terminal can use at least one shared physical user interface device, such as a touch-sensitive surface. One or more functions of the touch-sensitive surface and corresponding information displayed on the terminal may be adjusted and/or changed from one application to the next and/or adjusted and/or varied within the corresponding application. In this way, the shared physical architecture of the terminal, such as a touch-sensitive surface, can support various applications with a user interface that is intuitive to the user.

Those skilled in the art can understand that all or part of operations of the methods described in the above implementations can be implemented by computer programs to instruct related hardware. The computer programs can be stored in a computer readable storage medium. The computer programs, when executed, are operable to implement operations described in the above method implementations. The computer readable storage medium may be a disk, compact disc (CD), a read-only memory (ROM), a random-access memory (RAM), and the like.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for data migration, comprising:
    establishing a communication connection with a source migration terminal;
    acquiring a file list on the source migration terminal after accessing the source migration terminal; and
    executing first operations and second operations in parallel, wherein
        the first operations comprise reading out files on the source migration terminal according to the file list and storing the files read out on a migration terminal; and
        the second operations comprise displaying the file list, receiving selection of a non-migrated file in the file list, and deleting the non-migrated file from the migration terminal after the non-migrated file is migrated from the source migration terminal to the migration terminal and stored in the migration terminal.

2. The method of claim 1, wherein the file list contains information of all files to be migrated.

3. The method of claim 1, wherein the communication connection with the source migration terminal comprises at least one of a Bluetooth connection, a wireless fidelity (Wi-Fi) connection, a near field communication (NFC) connection, and a wired connection.

4. The method of claim 1, wherein the second operations further comprise:
    after receiving the selection of the non-migrated file in the file list,
    updating the file list by removing the non-migrated file from the file list before the non-migrated file is migrated from the source migration terminal to the migration terminal and stored in the migration terminal.

5. The method of claim 1, wherein deleting the non-migrated file comprises:
    marking the non-migrated file with a deleting mark after the non-migrated file is migrated from the source migration terminal to the migration terminal and stored in the migration terminal; and
    deleting the non-migrated file with the deleting mark when all files in the file list have been migrated from the source migration terminal to the migration terminal and stored in the migration terminal.

6. The method of claim 5, further comprising:
    after removing information of the non-migrated file from the file list:
    displaying the information of the non-migrated file with a deleting mark in the file list;
    receiving a revoking instruction for deletion, when there is at least one file in the file list, which has not been migrated from the source migration terminal to the migration terminal and stored in the migration terminal; and
    acquiring the non-migrated file marked with the deleting mark corresponding to the revoking instruction for deletion and removing the deleting mark of the non-migrated file.

7. The method of claim 5, further comprising:
    after removing information of the non-migrated file from the file list:
    displaying the information of the non-migrated file in a separate non-migrated-file list;
    receiving a revoking instruction for deletion, when there is at least one file in the file list, which has not been migrated from the source migration terminal to the migration terminal and stored in the migration terminal; and
    acquiring the non-migrated file corresponding to the revoking instruction for deletion.

8. The method of claim 1, wherein the file list precludes an operating system file.

9. A terminal, comprising:
    at least one processor; and
    a computer readable storage, coupled to the at least one processor and storing at least one computer executable instruction thereon which, when executed by the at least one processor, cause the at least one processor to carry out actions, comprising:
        establishing a communication connection with a source migration terminal;
        acquiring a file list on the source migration terminal after accessing the source migration terminal; and
        executing first operations and second operations in parallel, wherein
            the first operations comprise reading out files on the source migration terminal according to the file list and storing the files read out on a migration terminal; and
            the second operations comprise displaying the file list, receiving selection of a non-migrated file in the file list, and deleting the non-migrated file from the migration terminal after the non-migrated file is migrated from the source migration terminal to the migration terminal and stored in the migration terminal.

10. The terminal of claim 9, wherein the file list contains information of all files to be migrated.

11. The terminal of claim 9, wherein the communication connection with the source migration terminal comprises at least one of: a Bluetooth connection, a wireless fidelity (Wi-Fi) connection, a near field communication (NFC) connection, and a wired connection.

12. The terminal of claim 9, wherein the second operations further comprise:
    after receiving the selection of the non-migrated file in the file list:
    updating the file list by removing information of the non-migrated file from the file list before the non-migrated file is migrated from the source migration terminal to the migration terminal and stored in the migration terminal.

13. The terminal of claim 9, wherein the at least one processor carrying out the action of deleting the non-migrated file is caused to carry out actions, comprising:
    marking the non-migrated file with a deleting mark after the non-migrated file is migrated from the source migration terminal to the migration terminal and stored in the migration terminal; and
    deleting the non-migrated file with the deleting mark when all files in the file list have been migrated from the source migration terminal to the migration terminal and stored in the migration terminal.

14. The terminal of claim 13, wherein the at least one processor is further caused to carry out actions, comprising:
    displaying information of the non-migrated file with a deleting mark in the file list;
    receiving a revoking instruction for deletion, when there is at least one file in the file list which has not been migrated from the source migration terminal to the migration terminal and stored in the migration terminal; and
    acquiring the non-migrated file marked with the deleting mark corresponding to the revoking instruction for deletion and removing the deleting mark of the non-migrated file.

15. The terminal of claim 13, wherein the at least one processor is further caused to carry out actions, comprising:
    displaying information of the non-migrated file in a separate non-migrated-file list;
    receiving a revoking instruction for deletion, when there is at least one file in the file list which has not been migrated from the source migration terminal to the migration terminal and stored in the migration terminal; and
    acquiring the non-migrated file corresponding to the revoking instruction for deletion.

16. The terminal of claim 9, wherein the file list precludes an operating system file.

17. A non-transitory computer-readable storage medium storing a computer program which, when executed by a processor, causes the processor to carry out actions:
    establishing a communication connection with a source migration terminal;
    acquiring a file list on the source migration terminal after accessing the source migration terminal; and
    executing first operations and second operations in parallel, wherein
        the first operations comprise reading out files on the source migration terminal according to the file list and storing the files read out on a migration terminal; and
        the second operations comprise displaying the file list, receiving selection of a non-migrated file in the file list, and deleting the non-migrated file from the migration terminal after the non-migrated file is migrated from the source migration terminal to the migration terminal and stored in the migration terminal.

18. The non-transitory computer-readable storage medium of claim 17, wherein the second operations further comprises:
    after receiving the selection of the non-migrated file in the file list:
    updating the file list by removing information of the non-migrated file from the file list before the non-migrated file is migrated from the source migration terminal to the migration terminal and stored in the migration terminal.

19. The non-transitory computer-readable storage medium of claim 17, wherein the computer program causing the processor to carry out the action of deleting the non-migrated file further causes the processor to carry out actions, comprising:
    marking the non-migrated file with a deleting mark after the non-migrated file is migrated from the source migration terminal to the migration terminal and stored in the migration terminal; and
    deleting the non-migrated file with the deleting mark when all files in the file list have been migrated from the source migration terminal to the migration terminal and stored in the migration terminal.

20. The non-transitory computer-readable storage medium of claim 17, wherein the computer program further causes the processor to carry out actions, comprising:
    displaying information of the non-migrated file with a deleting mark in the file list;
    receiving a revoking instruction for deletion, when there is at least one file in the file list which has not been migrated from the source migration terminal to the migration terminal and stored in the migration terminal; and
    acquiring the non-migrated file marked with the deleting mark corresponding to the revoking instruction for deletion and removing the deleting mark of the non-migrated file.

* * * * *